United States Patent Office 2,972,625
Patented Feb. 21, 1961

2,972,625

PROCESS FOR THE PREPARATION OF FERRIC NITROSO DIMETHYL DITHIOCARBAMATE

Irving Gibbs, Norwalk, Conn., assignor to R. T. Vanderbilt Company, Inc., New York, N.Y., a corporation of New York No Drawing. Filed Apr. 20, 1959, Ser. No. 807,321

13 Claims. (Cl. 260—439)

This invention relates to an improved method of making ferric nitroso dimethyl dithiocarbamate which is useful in fungicidal compositions because of its potency as a fungicide when mixed with small amounts of tetramethylthiuram disulfide and because of its attractive green color.

In the process described in my copending application Serial No. 447,891, filed August 4, 1954, for making ferric nitroso dimethyl dithiocarbamate, a dimethyl dithiocarbamate is reacted with a soluble ferrous salt and a nitrite salt in acid liquid medium to form a slurry of ferric nitroso dimethyl dithiocarbamate in the liquid medium, after which the excess acid in the system is partially neutralized and the solids are filtered and washed to remove soluble impurities. The product, however, contains about 30% of tetramethylthiuram disulfide based on the weight of ferric nitroso dimethyl dithiocarbamate. The tetramethyl compound, although desirable in small amounts because it enhances and promotes the fungicidal properties of ferric nitroso dimethyl dithiocarbamate, has certain disadvantages in that it may be toxic if it is present in the fungicidal composition in large amounts.

Accordingly, an object of the present invention is to prepare ferric nitroso dimethyl dithiocarbamate by improved procedure which makes possible a reduction and more rigorous control of the content of tetramethylthiuram disulfide.

Other objects and advantages of the invention will appear from the following description.

In accordance with the present invention, I follow the general procedure stated above for preparing the desired compound but in addition I increase the pH of the slurry of ferric nitroso dimethyl dithiocarbamate in the liquid medium to a value well above the neutral point, i.e., at least to about 9 and thereafter filter the solids from the liquid in the slurry and wash the solids to remove soluble impurities.

The nitric oxide will usually be generated in the system by reaction between a nitrite salt such as sodium nitrite and an acid such as sulfuric acid. The amount of acid in the system should preferably be such as to reduce the pH to 6 or below, preferably in the range of 5 to 6 during the reaction between the dimethyl dithiocarbamate, the ferrous salt and the nitric oxide. Furthermore, it is known that nitrous acid, which is formed by the reaction between the nitrite and the sulfuric acid, will decompose into nitric oxide or into other products depending upon the conditions prevailing in the system, for example the temperature of the liquid medium and the concentration of the reactants. Accordingly, for the purpose of the present invention those conditions are maintained that bring about the formation of nitric oxide.

It is known that the nitric oxide is more soluble in cold water and accordingly, for reactions of this type, temperatures somewhat lower than room temperature, i.e., 32° to 60° F. are frequently employed. Furthermore, the lower temperatures generally favor the formation of lower amounts of tetramethylthiuram disulfide. For the purpose of convenience, however, it may be preferred to maintain the reaction system at room temperature and such operation is satisfactory for producing the desired product.

Since all of the nitrogen oxides are generally volatile substances, there is a certain amount that may or will be lost by evaporation. Accordingly, to realize optimum yields we prefer to use 10% or even more excess nitric oxide over that that is required by the stoichiometry of the reaction. As a source of the iron salt I preferably use a soluble ferrous salt such as hydrated ferrous sulfate. However, other soluble ferrous salts can be used if desired.

The dimethyl dithiocarbamate will usually be added in the form of a sodium salt. This can be made in the known manner of reacting stoichiometric amounts of sodium hydroxide, dimethyl amine and carbon disulfide. In place of sodium dimethyl dithiocarbamate there can be used potassium dimethyl dithiocarbamate or other water soluble salts of dimethyl dithiocarbamic acid.

In one type of procedure for preparing the ferric nitroso dimethyl dithiocarbamate, a dilute solution of sodium dimethyl dithiocarbamate and sodium nitrite is prepared. In a separate vessel a solution of ferrous sulfate and sulfuric acid is prepared. The ferrous sulfate solution is added slowly with good agitation to the sodium dimethyl dithiocarbamate-sodium nitrite solution. The pH is then determined to make certain that it is about 6 or below, preferably between 5 and 6. After stirring for a period of time a sufficient amount of sodium hydroxide is added to neutralize the excess acid and furthermore to carry the pH well above the neutral point, i.e., 9 or above. The aqueous slurry obtained is filtered and washed until it is free of all soluble salts. The product is dried at a temperature preferably not exceeding 140° F. The dried product may be ground in an inert atmosphere such as carbon dioxide or nitrogen to prevent loss of nitric oxide and/or spontaneous combustion.

The reason for increasing the pH of the slurry well above the neutral point is to prevent the formation of the cationic form of ferric nitroso dimethyl dithiocarbamate, which is brown in color. The anionic form, which is the desired product, is green. Transference studies have made this evident. See Mueller, Inorganic Chemistry—An Advanced Textbook, John Wiley & Sons, Inc., New York, 1952, page 603. The true nature of these materials, however, is not known. The higher pH also retards the formation of tetramethylthiuram disulfide by completely neutralizing any residual nitric oxide.

In an alternative procedure, a solution of ferrous sulfate and sufficient sulfuric acid to aid in dissolving the ferrous sulfate is added slowly to an aqueous solution of sodium dimethyl dithiocarbamate (in the absence of nitrous acid). This causes the precipitation of a light-brown slurry of ferrous dimethyl dithiocarbamate. The solution of sodium nitrite in water is then added to the slurry with stirring. The pH is maintained between 5 and 6 at all times by adding further amounts of sulfuric acid. Stirring is continued until the reaction is complete and sodium hydroxide is added to raise the pH to about 9 or above as previously stated. Thereafter the material is filtered, washed and dried as before. It will be seen, therefore, that it is possible first to effect precipitation of ferrous dimethyl dithiocarbamate and thereafter react it with nitric oxide, or alternatively to bring about the precipitation in the presence of the nitric oxide and thereby form the ferric nitroso dimethyl dithiocarbamate in a single operating step.

The invention is illustrated by the following examples in which the parts and percentages are on a weight basis unless otherwise indicated.

EXAMPLE I

The reactants are as follows:

|  | Parts | Moles |
|---|---|---|
| (a) 40% sodium dimethyl dithiocarbamate | 1,100 | 3.08 |
| (b) Sodium nitrite (95%) | 175 | 2.41 |
| (c) Ferrous sulfate crystals (FeSO$_4$·7H$_2$O) | 429 | 1.54 |
| (d) Sulfuric acid (96%) | 77.5 | 0.76 |
| (e) Sodium hydroxide (10%) | 300 | |

Procedure A

The sodium dimethyl dithiocarbamate is diluted to a 5% aqueous solution and the sodium nitrite is added and stirred until dissolved. In a separate tank the ferrous sulfate is added to water and then the sulfuric acid is added so that an approximately 10–15% solution is obtained. The ferrous sulfate solution is then added slowly with good agitation to the sodium dimethyl dithiocarbamate solution (77° F. reaction temperature). The pH is checked using a pH meter after stirring 10 minutes to make certain that it is between 5 and 6. The stirring is continued for 1 hour and the pH again measured. The sodium hydroxide is added in an amount to bring the pH within the preferred range 9.5 to 11.0. The amount may vary within the range from 150 to 300 parts depending upon conditions. The pH is again measured after stirring for 15 minutes. The reaction proceeds in accordance with the following equation:

$$4(CH_3)_2NC(S)SNa + 2FeSO_4 + 3NaNO_2 + H_2SO_4 \rightarrow$$
$$2[(CH_3)_2NC(S)S]_2FeNO + 3Na_2SO_4 + NaNO_3 + H_2O$$

mined. The reaction conditions and yields, purity of product and the results of the fungicidal activity tests are presented in the table below (Tests 1, 2 and 3).

Procedure B

Procedure B differs from Procedure A in that the ferrous dimethyl dithiocarbamate slurry is first prepared. The sodium dimethyl dithiocarbamate is diluted to a concentration of 5% in one vessel. In a separate vessel the ferrous sulfate is added to water and sufficient sulfuric acid to aid in dissolving the ferrous sulfate and to give a 10 to 15% solution. The ferrous sulfate solution is then added to the solution of sodium dimethyl dithiocarbamate with good agitation. A light brown slurry is obtained. The sodium nitrite as a 20% aqueous solution is added to the slurry. The remaining sulfuric acid is diluted to a 10% solution and is added slowly to maintain the pH of the slurry in the range from 5 to 6. Stirring is continued for 1 hour and a dark green product is obtained. The pH is checked periodically with a pH meter and is maintained in the range 5 to 6. The sodium hydroxide is then added and the stirring continued for 15 minutes longer while controlling the pH within the range prescribed for Procedure A. The color generally turns to a lighter shade of green upon adding the sodium hydroxide. The slurry is filtered and washed with water until it is free of sulfate as shown by checking the filtrate with barium chloride solution. The product is dried and ground as described in Procedure A. The reaction conditions, yields and purity of product as well as the results of the fungicidal activity tests are presented in the table below.

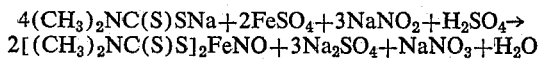

PROCEDURE A

| Test No. | Temperature, °F. | pH Precipitation | pH After NaOH Addition | Color Dried Product | Amount NaNO$_2$ | Tetramethyl Cpd., Percent | CHCl$_3$ Insol. | Yield [1] | Fungicidal Activity [2] |
|---|---|---|---|---|---|---|---|---|---|
| 1 | 41 | 5.3 | 10.2 | Green | 10% xs | 2.0 | 23.5 | | +1,000 |
| 2 | 77 | 6.1 | 10.7 | do | 20% xs | 10.7 | 13.1 | 231 | 300–500 |
| 3 | 77 | 5.5 | 9.8 | do | 10% xs | 11.8 | 13.9 | 230 | 300–500 |
| 4 | 77 | 5.7 | 10.0 | do | 20% xs | 12.0 | 11.2 | 240 | 300–500 |
| 5 | 77 | 5.4 | 10.8 | do | Stoichio | 11.4 | 15.6 | 220 | 300–500 |

PROCEDURE B

| | | | | | | | | | |
|---|---|---|---|---|---|---|---|---|---|
| 6 | 77 | 5.2 | 10.8 | Green | 10% xs | 1.8 | 17.8 | 200 | +1,000 |
| 7 | 95 | 5.6 | 10.2 | do | 10% xs | 8.0 | 17.7 | 205 | 500 |

[1] Theoretical yield 250.
[2] Lowest p.p.m. to inhibit.

The slurry that has been formed is filtered and washed until the effluent is sulfate-free as determined by observing any precipitate formed by adding barium chloride. The product is dried at 140° F., higher temperatures being preferably avoided to minimize the danger of spontaneous combustion, and it may thereafter be ground with Dry Ice. A number of products were made following the foregoing procedure and they were analyzed by infrared techniques to determine the content of tetramethyl thiuramdisulfide. The amount of chloroform insoluble material present was also measured. The products were tested for fungicidal activity using a standard agar incorporation technique.

In the agar incorporation procedure the test chemical is incorporated into the agar and the agar after hardening is inoculated with Aspergillus niger by touching a loop of the fungus spores to the agar surface three times. The agar is then incubated at 91.4° F. for a period of 96 hours and observations are made for growth. A series of determinations (1000 p.p.m., 500 p.p.m., 300 p.p.m., 100 p.p.m.) are made for each of the test compositions and the lowest concentration in parts per million of test compound needed to inhibit growth is deter- It will be noted that Test No. 6 which was carried out by Procedure B produced a product that contained only 1.8% of tetramethylthiuram disulfide and, by the same token, it did not exhibit any fungicidal activity. Accordingly, various amounts ranging from 5 to 20% tetramethylthiuram disulfide were added to the product and thoroughly mixed therewith. Tests of the fungicidal activity were made on the mixtures and they were found to be substantially of the same order of fungicidal activity as products containing tetramethylthiuram disulfide formed in situ.

It is not essential that the process of the present invention be carried out precisely as described in the example. Essentially, the ferric nitroso dimethyl dithiocarbamate is prepared by reacting in an aqueous solution containing nitric oxide (formed in the examples from the sodium nitrite and sulfuric acid), preferably in some excess, approximately chemical equivalent amounts of a water-soluble dimethyl dithiocarbamate and a water-soluble ferrous salt, and including the step of raising the pH of the slurry of ferric nitroso dimethyl dithiocarbamate well above the neutral point before filtering. Thus in place of sodium dimethyl dithiocarbamate there can be used potassium or other water soluble salts of dimethyl dithiocarbamic acid salts, and in place of the ferrous sulfate there can be used ferrous ammonium sulfate, ferrous chloride or other water soluble ferrous salts.

I claim:
1. The process of preparing ferric nitroso dithiocarbamate which comprises reacting a dimethyl dithiocarbamate with ferrous salt and nitric oxide in acid liquid medium to form a slurry of ferric nitroso dimethyl dithiocarbamate in the liquid medium, increasing the pH of the slurry to at least about 9, filtering the solids from the liquid and washing the solids to remove soluble impurities.

2. The process of claim 1 wherein the pH of the slurry of ferric nitroso dimethyl dithiocarbamate is raised to a value in the approximate range 9 to 12 by the addition of an alkaline material before filtering.

3. The process of claim 2 wherein the pH of the slurry of ferric nitroso dimethyl dithiocarambate is about 10 at the time of filtration.

4. The process of claim 1 wherein the pH of the acid liquid medium is in the range of 5 to 6.

5. The process of claim 1 wherein the ferric nitroso dimethyl dithiocarbamate slurry is formed by mixing an acid solution of a ferrous salt with a solution of a dimethyl dithiocarbamate and a nitrite with good agitation.

6. The process of claim 1 wherein ferrous dimethyl dithiocarbamate is first formed and thereafter treated in the form of an aqueous slurry with nitric oxide to form a slurry of ferric nitroso dimethyl dithiocarbamate.

7. The process of claim 6 wherein the pH of the slurry of ferric nitroso dimethyl dithiocarbamate is raised to a value in the approximate range of 9 to 12 by the addition of an alkaline material before filtering.

8. The process of claim 7 wherein the pH of the slurry of ferric nitroso dimethyl dithiocarbamate is about 10 at the time of filtration.

9. The process of claim 6 wherein the pH of the acid liquid medium is in the range 5 to 6.

10. The process of claim 5 wherein the pH of the slurry of ferric nitroso dimethyl dithiocarbamate is raised to a value in the approximate range 9 to 12 by the addition of an alkaline material before filtering.

11. The process of claim 10 in which the pH of the slurry of ferric nitroso dimethyl dithiocarbamate is about 10 at the time of filtration.

12. The process of claim 5 wherein the acid liquid medium formed by the mixing is in the range 5 to 6.

13. The process of preparing ferric nitroso dimethyl dithiocarbamate containing about 10% of tetramethylthiuram disulfide comprising the steps of reacting a dimethyl dithiocarbamate with a ferrous salt and a nitrite at room temperature in a liquid solution having a pH range of 5 to 6 to form a slurry of precipitated ferric nitroso dimethyl dithiocarbamate and tetramethylthiuram disulfide, increasing the pH of the slurry to at least about 9, filtering the solids from the slurry and washing the solids to remove soluble impurities.

References Cited in the file of this patent

UNITED STATES PATENTS 2,406,960　　Neal et al. _____ Sept. 3, 1946

OTHER REFERENCES

Cambi et al.: Chem. Absts., vol. 26, page 41 (1932).